(12) United States Patent
Chang et al.

(10) Patent No.: US 9,158,884 B2
(45) Date of Patent: Oct. 13, 2015

(54) METHOD AND SYSTEM FOR REPAIRING WAFER DEFECTS

(71) Applicant: Taiwan Semiconductor Manufacturing Company, Ltd., Hsin-Chu (TW)

(72) Inventors: Shih-Ming Chang, Zhubei (TW); Chih-Ming Lai, Hsinchu (TW); Hung-Chang Hsieh, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 65 days.

(21) Appl. No.: 14/071,352

(22) Filed: Nov. 4, 2013

(65) Prior Publication Data

US 2015/0128098 A1    May 7, 2015

(51) Int. Cl.
*G06F 17/50* (2006.01)

(52) U.S. Cl.
CPC ........ *G06F 17/5081* (2013.01); *G06F 2217/06* (2013.01); *G06F 2217/12* (2013.01)

(58) Field of Classification Search
CPC . G03F 7/70433; G03F 7/70866; G06T 7/001; G06T 7/0002; G06T 17/5068
USPC .............................................. 716/50, 51, 52
See application file for complete search history.

(56) References Cited

U.S. PATENT DOCUMENTS

| | | | | |
|---|---|---|---|---|
| 6,235,434 | B1* | 5/2001 | Sweeney et al. | 430/5 |
| 6,753,538 | B2* | 6/2004 | Musil et al. | 250/492.2 |
| 6,753,947 | B2* | 6/2004 | Meisburger et al. | 355/69 |
| 7,093,229 | B2* | 8/2006 | Pang et al. | 716/52 |
| 7,379,159 | B2* | 5/2008 | Baselmans et al. | 355/55 |
| 7,488,960 | B2* | 2/2009 | Zani et al. | 250/492.21 |
| 7,703,049 | B2* | 4/2010 | Abrams et al. | 716/50 |
| 7,707,541 | B2* | 4/2010 | Abrams et al. | 716/50 |
| 7,781,749 | B2* | 8/2010 | Imai | 250/503.1 |
| 7,808,611 | B2* | 10/2010 | Streefkerk et al. | 355/30 |
| 8,548,223 | B2* | 10/2013 | Inoue et al. | 382/145 |
| 8,737,676 | B2* | 5/2014 | Tsuchiya et al. | 382/100 |
| 2012/0140060 | A1* | 6/2012 | Tsuchiya et al. | 348/126 |

* cited by examiner

*Primary Examiner* — Sun Lin
(74) *Attorney, Agent, or Firm* — Haynes and Boone, LLP

(57) ABSTRACT

A method of lithographic defect detection and repair is disclosed. In an exemplary embodiment, the method of patterning a workpiece comprises receiving a mask for patterning a workpiece. The mask is inspected for defects, and a mask defect is identified that is repairable in the workpiece. The workpiece is lithographically exposed using the mask, and a defect is repaired within the workpiece based on the identified mask defect. The method can further comprise comparing defects across the workpiece to determine repeating defects and determining a spacing between the repeating defects. A distance between a first focal point and a second focal point of a lithographic system can be configured to correspond to the spacing between the repeating defects. Thus, a first repeating defect and a second repeating defect can be repaired concurrently.

20 Claims, 5 Drawing Sheets

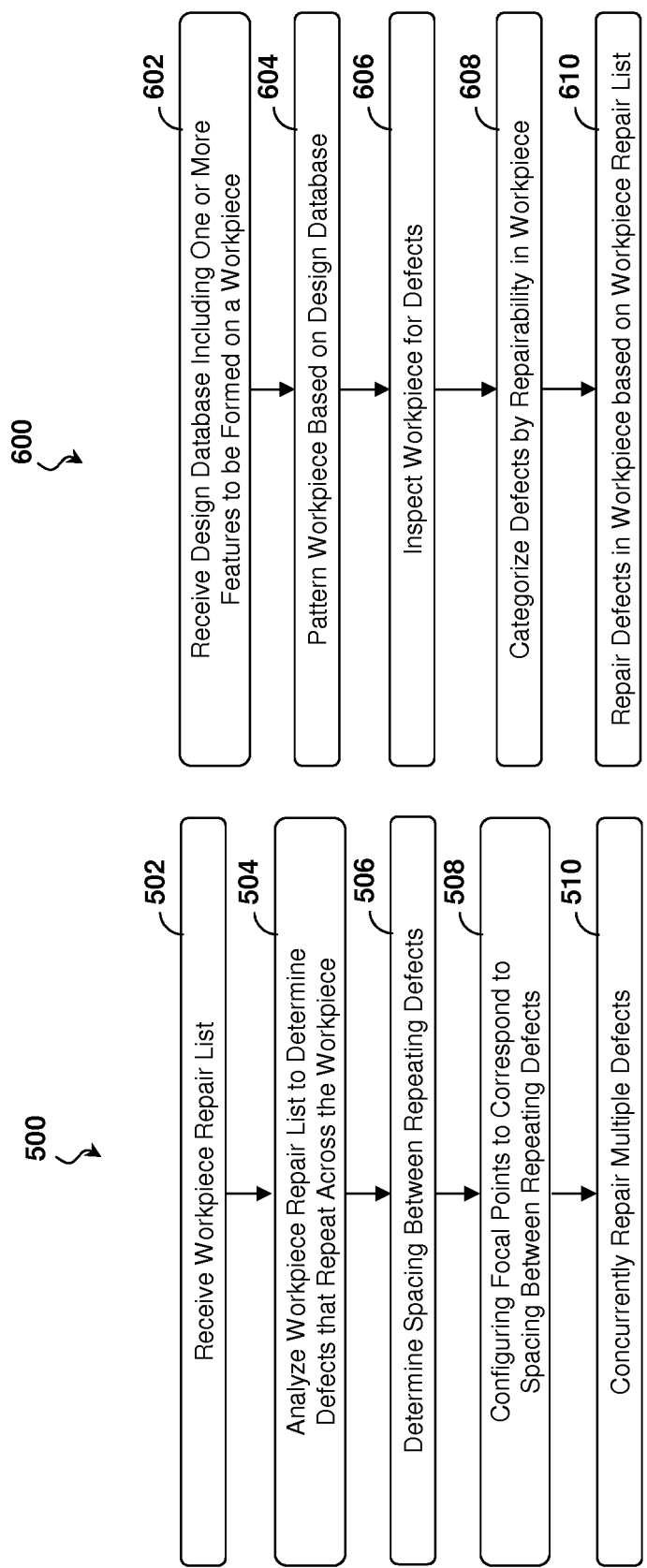

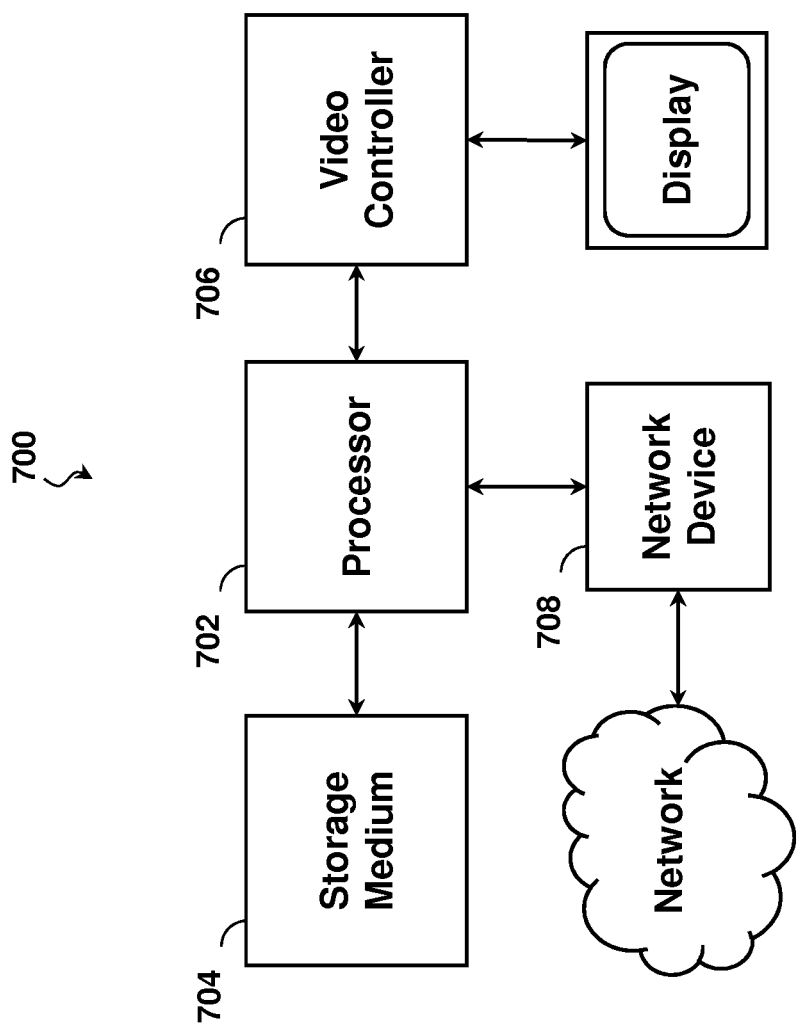

METHOD AND SYSTEM FOR REPAIRING WAFER DEFECTS

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of fabrication and verification processes for ICs, and, for improvements to be fully realized, further developments in IC manufacturing are needed.

As merely one example, advances in lithography have been important to reducing device size. In general, lithography is the transfer of a pattern onto a target such as a semiconductor substrate or mask. In one type of lithography, referred to as photolithography, radiation such as ultraviolet light passes through or reflects off a mask before striking a photoresist coating on target. The mask transfers the pattern onto the photoresist, which is then selectively removed to reveal the pattern. The target then undergoes processing steps that take advantage of the shape of the remaining photoresist to create features on the target. Another type of lithography, referred to as direct-write lithography, uses a laser, an electron beam (e-beam), ion beam, or other narrow-focused emission to expose a photoresist or other material layer of the target. E-beam lithography is one of the most common types of direct-write lithography, and, by directing a collimated stream of electrons to the area to be exposed, can be used to remove, add, or otherwise change a material layer with incredible accuracy. While precise, the narrow focus often makes direct-write lithography slower than photolithographic methods.

Accordingly, despite remarkable advances in photolithography and direct-write lithography, increasing lithographic precision has increased the cost and complexity of the lithographic process. Therefore, while existing lithographic techniques have been generally adequate, they have not proved entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 5 is a flow diagram of a method for multiple concurrent defect repair of a workpiece according to various aspects of the present disclosure.

FIG. 6 is a flow diagram of a method for maskless fabrication and defect repair of a workpiece according to various aspects of the present disclosure.

FIG. 7 is a system diagram of a computing system according to various aspects of the present disclosure.

DETAILED DESCRIPTION

Figure 1:
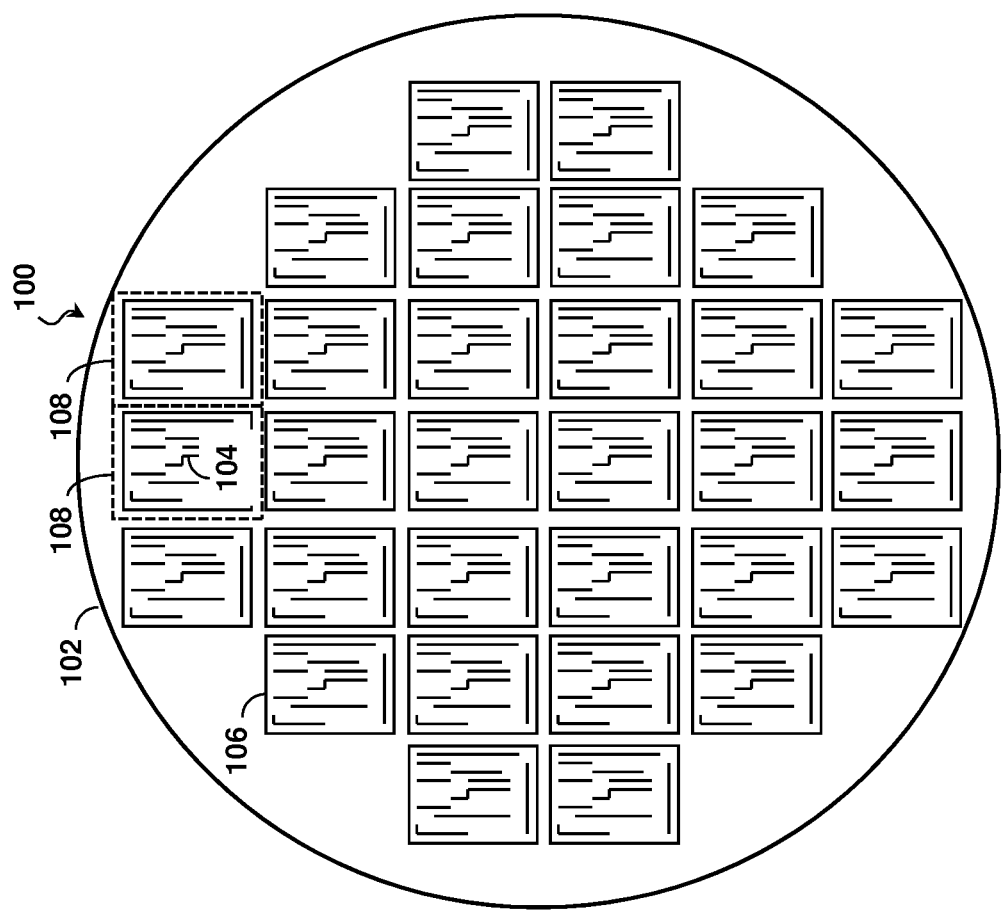
FIG. 1 is a top view of a workpiece according to various aspects of the present disclosure.

The present disclosure relates generally to IC device manufacturing and, more particularly, to a system and method for defect detection and repair in a lithographic environment.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

FIG. 1 is a top view of a workpiece 100 according to various aspects of the present disclosure. FIG. 1 has been simplified for the sake of clarity and to better illustrate the concepts of the present disclosure. Additional features may be incorporated into the workpiece 100, and some of the features described below may be replaced or eliminated for other embodiments of the workpiece 100.

The workpiece 100 includes a substrate 102 or wafer. Although the illustrated substrate 102 is characteristic of a semiconductor-type substrate, the principles described herein apply equally to mask substrates, non-semiconductor substrates, and other substrate types and materials. By layering features 104 upon the substrate 102, structures such as integrated circuit devices can be manufactured on the substrate 102. These circuit devices may include P-channel field effect transistors (PFETs), N-channel FETs (NFETs), metal-oxide semiconductor field effect transistors (MOSFETs), complementary metal-oxide semiconductor (CMOS) transistors, FinFETs, high voltage transistors, high frequency transistors, bipolar junction transistors, diodes, resistors, capacitors, inductors, varactors, other suitable devices, and/or combinations thereof.

In some embodiments, a semiconductor-type substrate 102 includes an elementary semiconductor (e.g., silicon or germanium) and/or a compound semiconductor (e.g., silicon germanium, silicon carbide, gallium arsenic, indium arsenide, gallium nitride, and indium phosphide). Other exemplary substrate materials include alloy semiconductors, such as silicon germanium carbide, gallium arsenic phosphide, and gallium indium phosphide. The semiconductor-type substrate 102 may also comprise non-semiconductor materials including soda-lime glass, fused silica, fused quartz, calcium fluoride ($CaF_2$), and/or other suitable materials. In some embodiments, the semiconductor-type substrate 102 has one or more layers defined within it, such as an epitaxial layer. For example, in one such embodiment, the substrate 102 includes an epitaxial layer overlying a bulk semiconductor. Other layered substrates include semiconductor-on-insulator (SOI) substrates. In one such SOI substrate, the substrate 102 includes a buried oxide (BOX) layer formed by a process such as separation by implanted oxygen (SIMOX). In various embodiments, the substrate 102 may take the form of a planar substrate, a fin, a nanowire, and/or other forms known to one of skill in the art.

The substrate 102 may include one or more doped regions. For example, a region of the substrate 102 may be doped with a p-type dopant. Suitable p-type dopants include boron, gallium, indium, other suitable p-type dopants, and/or combinations thereof. The substrate may also include one or more regions doped with an n-type dopant such as phosphorus, arsenic, other suitable n-type dopants, and/or combinations thereof. Doping may be implemented using a process such as ion implantation or diffusion in various steps and techniques.

Doped regions, dielectric materials, isolation features, material layers, conductive traces, and other structures formed on or within the substrate 102 may be referred to generally as features 104. Features 104 act as the building blocks for integrated circuits as well as other mechanical, chemical, and/or electrical structures. In the illustrated embodiment, the features 104 formed on the substrate 102 are grouped into dies 106, which represent discrete integrated circuit devices. Due to the small size of the dies 106, it is common for several dies 106 to be formed on the same workpiece 100. The dies 106 are typically separated once fabrication is complete.

As can be seen, the features 104 may have repeating patterns. In many photolithographic environments, the repeating pattern is formed using a single mask, which is moved (or stepped) in between exposures. The area exposed in each alignment may be referred to as a field 108. This technique dramatically reduces the cost of the mask and the projection system. However as a consequence of stepping, if a mask error does exist, the single mask error may be replicated multiple times throughout the workpiece 100.

Figure 2:
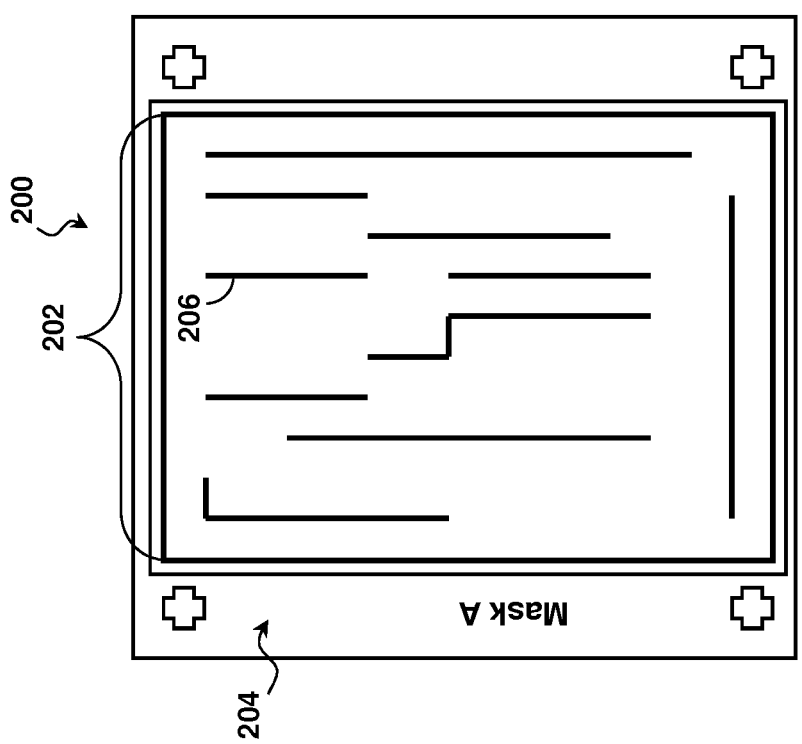
FIG. 2 is a diagrammatic top view of a mask for IC manufacturing according to various aspects of the present disclosure.

FIG. 2 is a diagrammatic top view of a mask 200 for IC manufacturing according to various aspects of the present disclosure. FIG. 2 has been simplified for the sake of clarity and to better illustrate the concepts of the present disclosure. Additional features may be incorporated into the mask 200, and some of the features described below may be replaced or eliminated for other embodiments of the mask 200.

In the illustrated embodiment, the mask 200 contains a die area 202 and a non-printing frame area 204 that may contain alignment marks, identification marks, and other features that are not part of an integrated circuit. The mask 200, or more particularly the mask features 206 within the die area 202, define the features 104 to be formed on a workpiece 100. Because of a variety of optical effects, mask features 206 are not necessarily identical to their corresponding workpiece features 104. In various embodiments, mask features 206 may include optical-proximity correction (OPC) enhancements such as hammerheads, serifs, and assist features. In a transmissive mask 200, mask features 206 may represent transmissive and/or opaque regions of the mask 200. In a reflective mask 200, mask features 206 may represent reflective and/or non-reflective regions of the mask 200.

During lithography, an emission such as ultra-violet (UV) light, deep ultra-violet (DUV) light, extreme ultra-violet (EUV) light, an e-beam, a laser, or other suitable emission type is directed at the mask. The energy that passes through a transmissive mask 200 or reflects off a reflective mask 200 transfers the pattern of the mask 200 to a photoresist layer formed on the substrate 102 of the workpiece 100. Photoresist materials are photoactive compounds that undergo a property change when exposed to lithographic energy at a dosage greater than a threshold of the photoresist. Based on this property change, exposed or unexposed portions of the photoresist can be selectively removed in order to form the respective features 104 on the workpiece 100. In various embodiments, the photoresist may be a positive- or negative-type resist and may be configured to be sensitive to any lithographic emission type.

The photolithograph process that transfers mask features 206 to the workpiece 100 may also transfer imperfections present in the mask 200. These imperfections may affect feature 104 formation and damage the devices formed on the workpiece 100. As minimum feature size decreases, the danger of imperfections grows, in part because the defects are larger relative to the workpiece features 104. Further complicating matters, advanced photolithographic techniques are more complex and have more opportunities to introduce defects. For example, some reflective masks 200 used to form extremely small workpiece features 104 are prone to imperfections within the array of reflective layers. These imperfections may be difficult or impossible to detect before the mask is printed. For these reasons and others, systems and methods to efficiently repair defects within a mask 200 and upon a workpiece 100 have the potential to dramatically improve yield.

Figure 3:
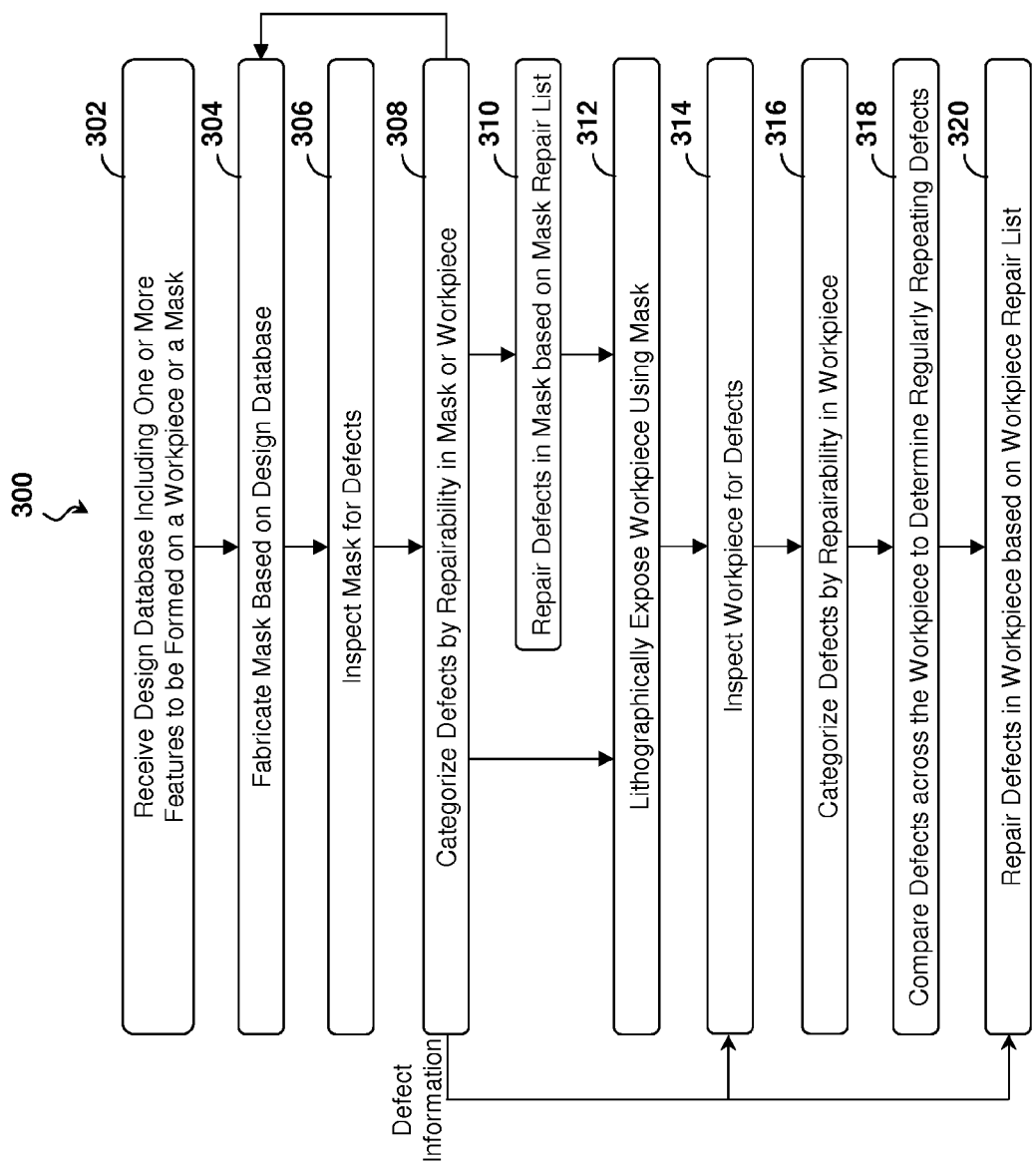
FIG. 3 is a flow diagram of a method for defect repair of a workpiece according to various aspects of the present disclosure.

FIG. 3 is a flow diagram of a method 300 for defect repair of a workpiece according to various aspects of the present disclosure. It is understood that additional steps can be provided before, during, and after the method 300 and that some of the steps described can be replaced or eliminated for other embodiments of the method 300.

Referring to block 302, a design database is received. The design database may include a number of features 104 intended to be formed on a workpiece, such as workpiece 100 of FIG. 1 and/or may include a number of mask features 206 intended to be formed on a mask, such as mask 200 of FIG. 2. The design database may take the form of a data file stored on a non-transitory computer-readable medium and may be represented in any design standard such as GDSII, OASIS, or MEBES®, a registered trademark of Applied Materials.

Referring to block 304, a mask is fabricated based on the design database. The mask may be substantially similar to mask 200 of FIG. 2. In that regard, the mask 200 may include a mask substrate, an absorption layer, one or more attenuating layers, and/or one or more reflective layers. In various embodiments, fabricating the mask 200 includes shaping the absorption layer using a mask writing technique such as electron beam writing, ion beam writing, photolithography such as binary photolithography or phase shift photolithography coupled with etching such as wet or dry etching. In various further embodiments, fabricating the mask includes alternative mask writing technique.

Referring to block 306, the mask 200 is inspected for defects. In some embodiments, mask inspection includes imaging the mask 200. An exemplary system for imaging the mask 200 includes an energy source configured to expose the mask, an imaging sensor to detect energy transmitted through or reflected off the mask, and computing hardware to transform the output of the imaging sensor into a representation of the mask 200 referred to as a mask image. In some embodiments, the energy source operates at an actinic frequency, a frequency used to expose a workpiece, but commonly, imaging is performed with energy having a lower frequency. The imaging sensor is configured to detect the energy source emissions and may be oriented to perform inspection in any suitable optical plane. The mask imaging system records the raw values measured from the imaging sensor and produces a mask image. The system may also perform post processing to increase clarity, resolution, to simulate inspection in an alternate optical plane, or to highlight relevant features within the mask image. In further embodiments, an atomic force microscopy system utilizes one or more styluses to measure mask features 206. Force generated between the stylus tip and the mask, even in the absence of contact, deflects the stylus. This deflection is measured in order to determine the elevation of the mask 200 surface at the tip of the stylus and thereby generate a mask image.

Once the mask 200 has been imaged, the image may be compared to a reference image in order determine discrepancies that correspond to mask defects. In some embodiments, the comparison includes comparing the mask image to an image of another mask in a die-to-die comparison technique. In some embodiments, the comparison includes comparing the mask image to a simulated image generated from a master database such as the design database received in block 302. Of course, it is understood that these inspection methods are merely exemplary and other suitable mask imaging and/or mask defect detection techniques are contemplated and provide for.

Referring to block 308, any mask defects found in block 306 may be categorized. As indicated by the arrows, mask defect information is used at various inspection and repair steps throughout the method 300 including the workpiece inspection of block 314 and the repair of the workpiece in block 320. First, however, mask defects that can be resolved by modifying the mask are identified, and corresponding entries are added to a mask repair list. The mask repair list is then provided for use in repairing the mask defects. For example, defects in an absorption layer, such as a chromium layer, may be repaired by depositing additional absorptive material to the mask 200 or by removing existing absorptive material from the mask 200. In some exemplary embodiments, an e-beam writer performs Electron-Beam-Induced Deposition (EBID) to add material to the mask 200. In EBID, a process gas is introduced into a processing chamber containing the mask 200. The process gas is decomposed by an electron beam, and the decomposed molecules adhere to the mask 200 at the e-beam's point of impact. In some exemplary embodiments, an e-beam writer performs Electron-Beam-Induced Etching (EBIE) to remove material from the mask 200. In EBIE, a process gas reacts with a material of the mask 200 to remove the portion of the material located at the e-beam's point of impact. Other methods of repairing the mask 200 using direct-write and/or other techniques are both contemplated and provided for.

Referring back to block 308, mask defects that cannot be resolved in the mask may be further analyzed to determine whether they can be repaired on the workpiece 100. For example, defects located within the reflective layers of a reflective mask 200 may not be directly repairable by adding or removing mask material. Unfortunately, even with modern manufacturing techniques, defect-free reflective masks are the often the exception not the rule. Accordingly, in order to continue manufacturing even with imperfect masks 200, the categorization of block 308 may determine whether the defects can be repaired on the workpiece 100 after lithography. If so, entries corresponding to the defects are added to a workpiece repair list. For defects that cannot be repaired within either the mask 200 or the workpiece 100, the mask 200 may be scrapped and the mask making of block 304 may be repeated. This may include modifying the design database received in block 302.

The mask repair list and workpiece repair list may each take any suitable form such as a data file stored on a non-transitory computer-readable medium and may contain any relevant information pertaining to an identified defect including size, shape, location, probability of affecting performance of an integrated circuit device, and/or other suitable factors. In some embodiments, defects that do not meet a minimum of threshold probability of affecting performance of an integrated circuit device are removed from the respective lists.

In parallel with the defect detection and mask repair of blocks 306-310, the mask 200 may be used to lithographically expose the workpiece 100 in block 312. In various embodiments, the lithographic exposure includes soft baking, mask aligning, exposure, post-exposure baking, developing the photoresist, rinsing, and drying (e.g., hard baking). One or more material layers of the workpiece 100 may be etched using the remaining photoresist coating as a mask. This etching may include any suitable etching process such as dry etching, wet etching, ashing, and/or other etching methods (e.g., reactive ion etching). Remaining photoresist coating may be removed following the etching.

Referring to block 314, the exposed workpiece 100 may be inspected for defects. In various embodiments, inspection may be performed before baking and developing, between developing and etching, and/or after etching. Inspection may be performed using any suitable inspection technique. For example, inspection may include imaging the workpiece 100 in combination with a die-to-die or die-to-database comparison. Imaging the workpiece 100 may be performed using any suitable energy source operating at any suitable frequency, and may be performed in any suitable optical plane. Inspection of the workpiece 100 may also include contact-based inspection such as atomic force microscopy. In some embodiments, inspection includes an electrical performance test of integrated circuits formed on the workpiece 100.

Referring to block 316, any workpiece defects found in block 314 may be categorized. As with mask defects, many workpiece defects can be repaired by depositing additional material on or removing existing material from the workpiece 100. For defects that can be repaired on the workpiece 100, corresponding entries may be added to the workpiece repair list and provided for use in a wafer repair process described in detail below. In some embodiments, defects that do not meet a minimum of threshold probability of affecting performance of an integrated circuit device are removed from the workpiece repair list or are not added to the list.

Referring to block 318, workpiece defects may be compared across the workpiece 100 to determine regularly repeating defects. Some types of workpiece defects, including those arising from mask defects, are recognizable because they repeat regularly. That is, they are present and uniform across many, if not all, dies. In some embodiments, the repeating nature of the defects is leveraged to repair multiple defects concurrently as disclosed below.

Referring to block 320, the workpiece 100 may be repaired based on the entries within the workpiece repair list. In many regards, the workpiece repair of block 320 may be substantially similar to the mask repair of block 310. In various embodiments, repair is performed using a direct-write system such as an e-beam, ion-beam, or laser writer on the workpiece 100. Accordingly, the workpiece repair of block 320 may include converting the entries of the workpiece repair list into an instruction operable to direct the direct-write system to repair the corresponding workpiece defects. As with mask repair, repairing the workpiece may include performing Electron-Beam-Induced Deposition (EBID) to add material to the workpiece 100, Electron-Beam-Induced Etching (EBIE) to remove material from the workpiece 100, and/or other suitable methods of repairing the workpiece 100 using direct-write and/or other techniques.

Thus as the name implies, the workpiece repair list is used to direct the repair of the workpiece 100. By utilizing the workpiece repair list to repair mask defects on the workpiece 100, the method 300 allows a less-than-perfect mask to be used in production. In environments where masks with defects are less expensive, the method 300 may reduce cost per wafer. In environments where masks without defects are rare, the method 300 may offer the only practical technique for producing working devices.

As mentioned previously, direct-write techniques are precise, but are often slow. This has limited their use in patterning workpieces 100. However, the two-step process of method 300, utilizing photolithography to perform a first pass patterning and utilizing direct-write lithography to repair defects, may greatly reduce the amount direct-write lithography performed and thus increase the number of wafers-per-hour (wph).

Figure 4:
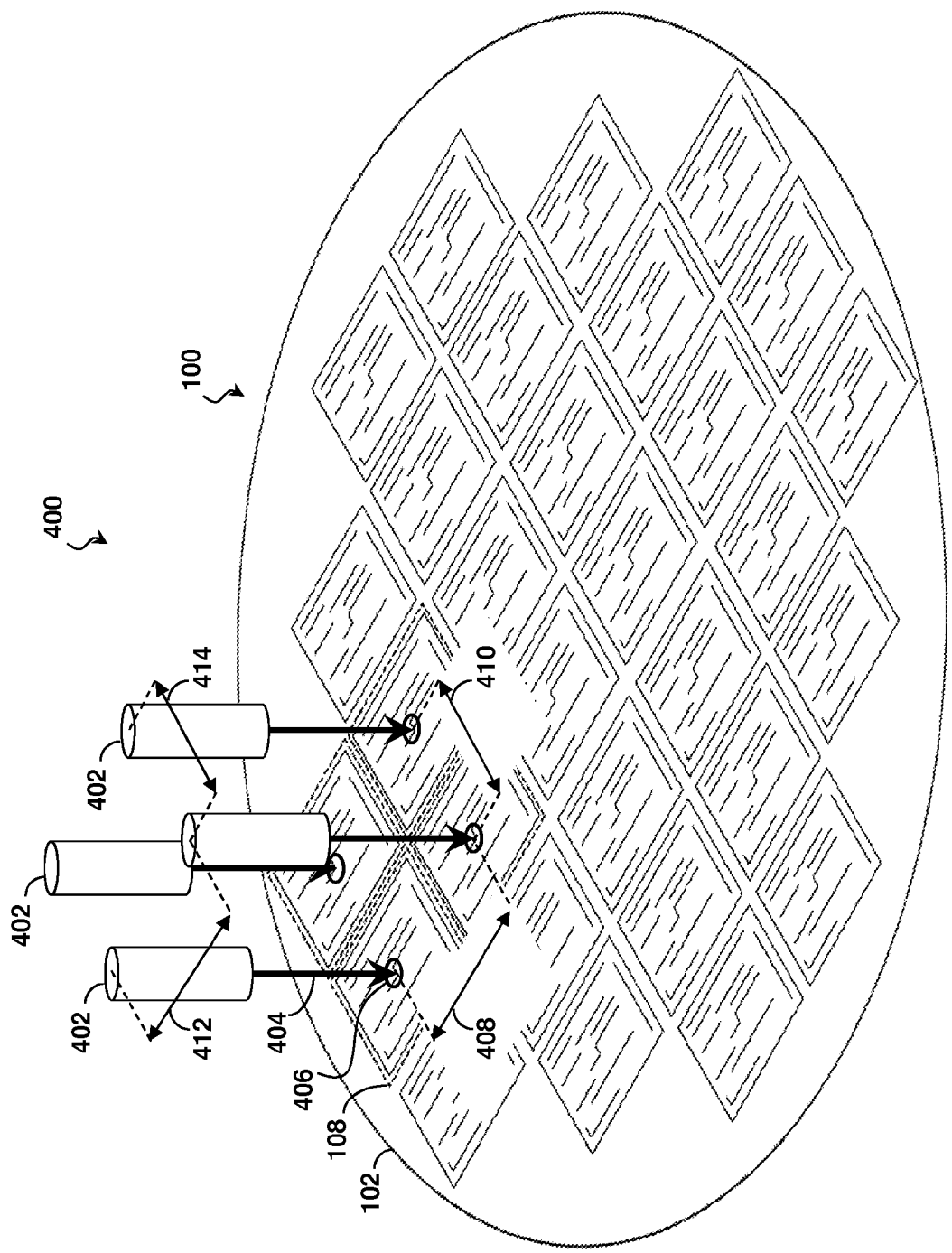
FIG. 4 is a perspective view of a multi-emitter direct-write system.

Utilizing a multi-emitter direct-write system may further reduce the time required for direct-write lithography. FIG. 4 is a perspective view of a multi-emitter direct-write system 400. The direct-write system 400 is characteristic of an e-beam, ion-beam, laser writer and/or other suitable direct-write system. FIG. 4 has been simplified for the sake of clarity and to better illustrate the concepts of the present disclosure.

The direct-write system 400 includes a plurality of focused energy emitters 402. In various embodiments, the energy emitters 402 include electron beam emitters, ion beam emitters, laser emitters, and/or other suitable emitting devices and may include both a beam source and a plurality of electromagnetic and/or optical lenses. The energy emitters 402 are aligned such that the emitted energy (represented by arrow 404) impacts the workpiece 100 at precise focal points 406 (enlarged for clarity). In the illustrated embodiment, the emitted energy is directed substantially perpendicular to a top surface of the workpiece 100. In further embodiments, a tilt-angle system 400 allows the emitted energy to be directed at oblique angles to the top surface.

The focal points 406 can be moved in unison by moving the emitters 402 as a group or by moving the workpiece 100. In some embodiments, the distance between the focal points 406 can also be adjusted (represented by arrows 408 and 410). In the illustrated direct-write system 400, the distance between focal points 406 is set by modifying the spacing between energy emitters 402 (illustrated as distances along axis 412 and axis 414). In some embodiments, the distance between focal points 406 is set by changing the orientation or angle of the emitters 402 with respect to the top surface of the workpiece 100. In some embodiments, the distance between focal points 406 is set by changing a strength or alignment of magnetic fields ("electromagnetic lenses") used to steer the emitted energy.

Because of the repeating nature of workpiece defects across fields 108, the distances between the focal points 406 may be configured such that each focal point 406 is aligned with the same relative position within the corresponding field 108. The focal points 406 are then scanned in unison thereby making similar repairs in each of multiple fields 108. This allows the direct-write system 400 to repair multiple defects concurrently and further reduces the duration of the repair.

FIG. 5 is a flow diagram of a method 500 for multiple concurrent defect repair of a workpiece 100 according to various aspects of the present disclosure. It is understood that additional steps can be provided before, during, and after the method 500 and that some of the steps described can be replaced or eliminated for other embodiments of the method 500. The method 500 is suitable for performing using the direct-write system 400 of FIG. 4.

Referring to block 502, a workpiece repair list is received. The workpiece repair list may be substantially similar to that described with reference to FIG. 3. In that regard, the workpiece repair list may take any suitable form such as a data file stored on a non-transitory computer-readable medium and may contain any relevant information pertaining to an identified defect including size, shape, location, probability of affecting performance of an integrated circuit device, and/or other suitable factors. In some embodiments, defects that do not meet a minimum of threshold probability of affecting performance of an integrated circuit device are removed from the list.

Referring to block 504, the workpiece repair list is analyzed to determine defects that repeat or occur more than one time across the workpiece 100. This repetition may be due to a corresponding mask defect, a characteristic of a lithographic device or process, a characteristic of a design, a characteristic of a workpiece 100, as well as any other cause. Referring to block 506, the spacing between the repeated defects is determined. In some embodiments, the spacing is often, though not necessarily, an integer multiple of a lithographic field 108 size. Referring to block 508, the alignment of a plurality of focal points 406 of a direct-write system is configured based on the spacing between the repeated defects. The configuration may include aligning the energy emitters 402 of the direct-write system such that each emitter 402 can repair a corresponding defect concurrently. In some embodiments, the configuration includes physically moving the energy emitters 402 with respect to one another. In some embodiments, the configuration includes adjusting the orientations of the energy emitters 402 with respect to a top surface of the substrate 102. In some embodiments, the configuration includes adjusting a field strength and/or orientation of magnetic field used to guide the energy emitted by an emitter 402.

Referring to block 510, the energy emitters 402 are activated in order to repair the repeated defects concurrently. The repair may involve any suitable technique. In some embodiments, the energy emitters 402 are used to expose a photoresist at the respective focal points 406. In some embodiments, the energy emitters 402 are used to perform electron-beam-induced deposition (EBID) at the respective focal points 406. In some embodiments, the energy emitters are used to perform electron-beam-induced etching (EBIE) at the respective focal points. Other suitable direct-write techniques are both contemplated and provided for. This concurrent defect repair may reduce the amount of time the direct-write tool is occupied, thereby increasing the efficiency of the production line. When combined with a method of detecting and designating repairs based on mask defects, such as method 300 of FIG. 3, the resulting method allows the use of less-than-perfect masks in fabrication, while keeping repair time to acceptable levels.

The systems and methods of the present disclosure are also equally applicable to maskless forms of patterning a workpiece. FIG. 6 is a flow diagram of a method 600 for maskless fabrication and defect repair of a workpiece 100 according to various aspects of the present disclosure. It is understood that additional steps can be provided before, during, and after the method 600 and that some of the steps described can be replaced or eliminated for other embodiments of the method 600.

Referring to block 602, a design database is received. The design database may include a number of features 104 intended to be formed on a workpiece, such as workpiece 100 of FIG. 1. The design database may take the form of a data file stored on a non-transitory computer-readable medium and may be represented in any design standard such as GDSII, OASIS, or MEBES®, a registered trademark of Applied Materials.

Instead of photolithography, the method 600 may utilize a direct-write technique for patterning the workpiece 100. Referring to block 604, the workpiece 100 is patterned based on the design database. Suitable direct-write techniques include electron beam writing, ion beam writing, laser writing, and/or other maskless or electronic mask writing techniques. The direct-writing technique may be used to expose a photoresist, to perform EBID, to perform EBIE, and/or to perform any other suitable patterning of the workpiece 100.

Referring to block 606, the patterned workpiece 100 is inspected for defects. The inspection may be substantially similar to the workpiece inspection of block 314 of FIG. 3. The inspection may be performed during the patterning of the workpiece 100, before baking and developing of the workpiece 100, between developing and etching, and/or after etching. In some embodiments, inspection is performed during the patterning by obtaining feedback from the direct-write system. In some such embodiments, the direct-write system provides diagnostic information regarding the patterning in progress in real time. This diagnostic information may report any process condition or event that may affect the patterning process such as a write-buffer under run, beam instability, beam drift, and other relevant events. As with the inspection of block 314 of FIG. 3, inspection may also include an electrical performance test and/or imaging the workpiece 100 in combination with a die-to-die or die-to-database comparison. In some embodiments, inspection of the workpiece 100 includes contact-based inspection such as MEMS-based atomic force microscopy.

Referring to block 608, any workpiece defects found in block 606 may be categorized. The defect categorization may be substantially similar to that described with reference to block 316 of FIG. 3. For defects that can be repaired on the workpiece 100, corresponding entries may be added to a workpiece repair list and provided for use in a wafer repair process. In some embodiments, defects that do not meet a minimum of threshold probability of affecting performance of an integrated circuit device are removed from the workpiece repair list or are not added to the list.

Referring to block 610, the workpiece 100 may be repaired based on the entries within the workpiece repair list. In many regards, the workpiece repair may be substantially similar to that of block 320 of FIG. 3. In various embodiments, repair is performed using a direct-write system such as an e-beam, ion-beam, or laser writer on the workpiece 100. Accordingly, the workpiece repair may include converting the entries of the workpiece repair list into a format suitable for causing the direct-write system to repair the corresponding workpiece defect.

Because the initial patterning may also be performed using a direct-write system, in some embodiments, the same direct-write system may be used for both the initial patterning and the repair. In some such embodiments, the direct-write system performs a multi-pass process in order to form the pattern and incorporates repairs into subsequent passes. Accordingly, a latter pass of the writer may be used for both patterning and repair of a previous pass. In such embodiments, the patterning and repair process can be performed in the same chamber, using the same tool, and without adding additional write iterations. In further such embodiments, the direct-write system performs a redundant pass process using multiple emitters, and the repair can be performed during the same process as the patterning by using a subsequent emitter. In such embodiments, the patterning and repair process can be performed in the same chamber and without affecting the number of write iterations. By performing both processes in the same chamber, the method 600 may reduce the risk of workpiece 100 contamination, and, in some embodiments, may make repairs without adding to the cost or time to form the workpiece 100.

FIG. 7 is a system diagram of a computing system 700 according to various aspects of the present disclosure. The computing system 700 may include a processor 702 such as a microcontroller or a dedicated central processing unit (CPU), a non-transitory computer-readable storage medium 704 (e.g., a hard drive, random access memory (RAM), a compact disk read only memory (CD-ROM), etc.), a video controller 706 such as a graphics processing unit (GPU), and a network communication device 708 such as an Ethernet controller or wireless communication controller. In that regard, in some embodiments, the computing system 600 is programmable and is programmed to execute processes including those associated with proximity effect determination and compensation. Accordingly, it is understood that any operation of the computing system 700 according to the aspects of the present disclosure may be implemented by the computing system 700 using corresponding instructions stored on or in a non-transitory computer readable medium accessible by the processing system.

The computing system 700 is operable to perform one or more of the processes described with respect to FIGS. 3, 5, and 6. In that regard, in various embodiments, the computing system 700 is operable to: receive a design database, fabricate a mask based on the design database, inspect the mask for defects, categorize defects by repairability, repair defects in the mask based on the mask repair list, lithographically expose a workpiece using a mask, inspect the workpiece for defects, categorize defects by repairability in the workpiece, compare defects across the workpiece to determine repeating defects, and/or repair defects in the workpiece. In various further embodiments, the computing system 700 is operable to: receive a workpiece repair list, analyze the list to determine defects that repeat across the workpiece, determine a spacing between repeating defects, adjust the focal points of a direct-write system to correspond to the spacing between the repeating defects, and/or concurrently repair multiple defects. In various further embodiments, the computing system 700 is operable to receive a design database, pattern a workpiece based on the design database, inspect the workpiece for defects, categorize defects by repairability, and/or repair defects in the workpiece based on a workpiece repair list.

The present embodiments can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, Random Access Memory (RAM).

Thus, the present disclosure provides a system and method for lithographic defect detection and repair. In some embodiments, method of patterning a workpiece is provided. The method comprises receiving a mask for patterning a workpiece; inspecting the mask for defects; identifying a mask defect that is repairable in the workpiece; lithographically exposing the workpiece using the mask; and repairing a defect within the workpiece based on the identified mask defect.

In further embodiments, a method of modifying a pattern formed on a workpiece is provided. The method comprises receiving a patterned workpiece; receiving a workpiece repair list; determining defects of the patterned workpiece that repeat across the workpiece based on the workpiece repair list; determining a distance between defects of the patterned workpiece determined to repeat; configuring a distance between a first focal point of a first beam emitter of a direct-write system and a second focal point of a second beam emitter of the direct-write system, wherein the configured distance corresponds to the distance between defects; and concurrently repairing a first defect using the first beam emitter and a second defect using the second beam emitter.

In yet further embodiments, a method of patterning a workpiece is provided. The method comprises receiving a design database including a feature to be formed on a workpiece; patterning the workpiece based on the design database using a first direct-write system; inspecting the workpiece for defects; and using a second direct-write system, repairing the workpiece based on defects detected by inspecting the workpiece, wherein the inspecting of the workpiece for defects includes analyzing a process condition reported by the first direct-write system during the patterning of the workpiece.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of patterning a workpiece, the method comprising:
   receiving a mask for patterning a workpiece;
   inspecting the mask for defects;
   identifying a mask defect that is repairable in the workpiece;
   lithographically exposing the workpiece using the mask; and
   using a direct-write lithographic system, repairing a defect within the workpiece based on the identified mask defect.

2. The method of claim 1 further comprising adding an entry to a workpiece repair list corresponding to the mask defect based on the mask defect being repairable in the workpiece, and wherein the repairing the defect within the workpiece is based on the entry.

3. The method of claim 2 further comprising:
   inspecting the workpiece for defects;
   adding an entry to the workpiece repair list corresponding to a workpiece defect based on the workpiece defect being repairable in the workpiece; and
   repairing another defect within the workpiece based on the entry of the workpiece repair list that corresponds to the workpiece defect.

4. The method of claim 1, wherein the direct-write lithographic system is selected from a group consisting of: an electron-beam lithographic system, an ion-beam lithographic system, and a laser lithographic system.

5. The method of claim 1, wherein the receiving the mask comprises receiving a design database and fabricating the mask based on the design database.

6. The method of claim 1 further comprising:
   comparing workpiece defects to determine repeating defects;
   determining a spacing between a first repeating defect and a second repeating defect;
   configuring a distance between a first focal point of the direct-write lithographic system and a second focal point of the direct-write lithographic system, wherein the configured distance corresponds to the spacing; and
   concurrently repairing the first repeating defect and the second repeating defect using the direct-write lithographic system.

7. The method of claim 6, wherein the direct-write lithographic system includes one of: an electron-beam lithographic system, an ion-beam lithographic system, and a laser lithographic system.

8. The method of claim 6, wherein the configuring the distance between the first focal point and the second focal point includes configuring a distance between a first energy emitter of the lithographic system and a second energy emitter of the lithographic system.

9. The method of claim 6, wherein the configuring the distance includes configuring an orientation of a first energy emitter of the lithographic system with respect to the workpiece and an orientation of a second energy emitter of the lithographic system with respect to the workpiece.

10. The method of claim 6, wherein the configuring the distance between the first focal point and the second focal point includes configuring a field strength of an electromagnetic lens of the lithographic system.

11. A method of modifying a pattern formed on a workpiece, the method comprising:
   receiving a patterned workpiece;
   receiving a workpiece repair list;
   determining defects of the patterned workpiece that repeat across the workpiece based on the workpiece repair list;
   determining a distance between the defects of the patterned workpiece determined to repeat;
   configuring a distance between a first focal point of a first beam emitter of a direct-write system and a second focal point of a second beam emitter of the direct-write system, wherein the configured distance corresponds to the distance between the defects; and
   concurrently repairing a first defect using the first beam emitter and a second defect using the second beam emitter.

12. The method of claim 11, wherein the repairing the first defect and the second defect includes performing an electron-beam-induced deposition (EBID) to add a material to the workpiece.

13. The method of claim 11, wherein the repairing the first defect and the second defect includes performing an electron-beam-induced etching (EBIE) to remove a material from the workpiece.

14. The method of claim 11, wherein the configuring the distance between the first focal point and the second focal point includes configuring a distance between the first beam emitter and the second beam emitter.

15. The method of claim 11, wherein the configuring the distance includes configuring an orientation of the first beam emitter and an orientation of the second beam emitter.

16. The method of claim 11, wherein the configuring the distance between the first focal point and the second focal point includes configuring a field strength of an electromagnetic lens of the direct-write system.

17. A method of patterning a workpiece, the method comprising:

receiving a design database including a feature to be formed on a workpiece;
patterning the workpiece based on the design database using a first direct-write system;
inspecting the workpiece for defects; and
using a second direct-write system, repairing the workpiece based on the defects detected by inspecting the workpiece,
wherein the inspecting the workpiece for defects includes analyzing a process condition reported by the first direct-write system during the patterning the workpiece.

18. The method of claim 17, wherein the patterning the workpiece includes a multi-pass patterning process wherein a latter pass performs at least a portion of both the patterning the workpiece and the repairing the workpiece.

19. The method of claim 17, wherein the patterning the workpiece and the repairing the workpiece are performed during a redundant pass direct-write process.

20. The method of claim 17, wherein the patterning the workpiece and the repairing the workpiece are performed in a same process chamber.

* * * * *